United States Patent [19]

Moreland et al.

[11] 4,418,433

[45] Dec. 6, 1983

[54] METHOD AND SYSTEM FOR RECLAIMING AND RECYCLING GUM AND WATER IN A CARPET DYEING PROCESS

[75] Inventors: Ronald Moreland, Chatsworth; Marion L. Hawkins, Dalton, both of Ga.

[73] Assignee: Diamond Carpet Mills, Incorporated, Eton, Ga.

[21] Appl. No.: 290,935

[22] Filed: Aug. 7, 1981

[51] Int. Cl.³ .................... D06B 21/00; D06B 23/20
[52] U.S. Cl. .................................. 8/149.1; 8/149.3; 8/158; 68/5 D; 68/18 F; 68/20; 68/13 R
[58] Field of Search .................. 8/149.1, 149.3, 158; 68/5 D, 5 E, 18 F, 20, 18 R, 13 R; 118/603, 610; 427/345; 122/20 B

[56] References Cited

U.S. PATENT DOCUMENTS

| | | | |
|---|---|---|---|
| 3,683,648 | 8/1972 | Fleissner | 68/5 D |
| 3,800,568 | 4/1974 | Takriti et al. | 68/205 R |
| 3,804,590 | 4/1974 | Fleissner | 8/149.1 |
| 3,918,276 | 11/1975 | Bruckner | 68/18 R |
| 4,005,230 | 1/1977 | Fleissner | 427/354 |
| 4,010,709 | 3/1977 | Sayman et al. | 68/205 R X |
| 4,055,971 | 11/1977 | Hermes | 68/18 R X |
| 4,127,014 | 11/1978 | Miller et al. | 68/13 R |
| 4,189,302 | 2/1980 | Toland | 8/1 XA |

Primary Examiner—Philip R. Coe
Assistant Examiner—Thomas W. Epting
Attorney, Agent, or Firm—Kerkam, Stowell, Kondracki & Clarke

[57] ABSTRACT

A dyeing method and system for coloring the pile yarns of a carpet web provides for the reuse of gum used in the dyeing process and the reuse of water used for rinsing the carpet. The gum, which is extracted hot from the carpet web as it exits the steamer where the dye is set in the face yarns and prior to the rinsing of the carpet is filtered and passed through a heat exchanger into a gum storage tank for reuse. The heat exchanger is used to recover latent heat from the gum and preheat water on its way to a boiler used in the dyeing system.

21 Claims, 4 Drawing Figures

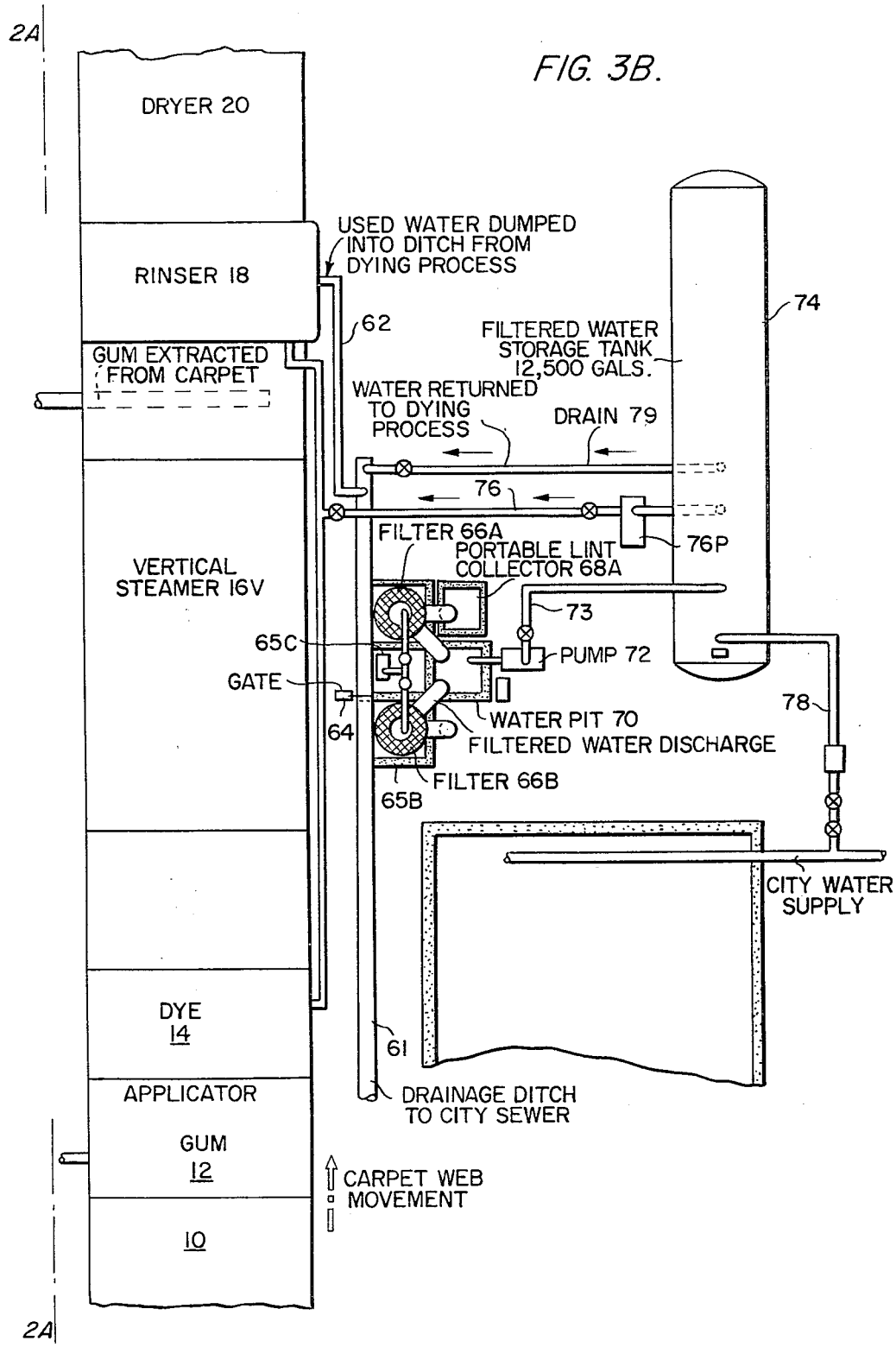

METHOD AND SYSTEM FOR RECLAIMING AND RECYCLING GUM AND WATER IN A CARPET DYEING PROCESS

TECHNICAL FIELD

This invention relates to a method and apparatus for dyeing textiles. More specifically, this invention relates to a method and apparatus for dyeing textiles wherein gum and water are reclaimed and reused and latent heat of the reclaimed gum is used to reduce energy requirements of the process.

BACKGROUND OF PRIOR ART

Various dyeing processes which use gum have heretofore been developed. In these processes a viscous gum layer is applied to the pile face of a carpet web being carried along a continuous conveyer. The gum acts as a carrier for the dye or as a barrier layer on the pile face of the carpet web. Although the gum layer is generally applied prior to application of dye to the pile face, some processes include a preliminary treatment of the web with dye prior to the application of gum and subsequent and further dye treatment after the application of gum layer. In either case, the final dye application is either applied on top of the viscous gum layer or mixed therewith.

In a particular popular dyeing process known as the TAK dye process which is the subject matter of U.S. Pat. Nos. 3,683,649; 3,731,503 and 3,800,568, jets of dye are dispersed from above into individual dye droplets along the breadth of a continuously traveling textile carpet web. Prior to application of the liquid dye, there is usually applied across the breadth of the carpet web, which is conventionally from 12 to 15 feet in width, a continuous layer of gum in the order of ⅛ to ¼ inch thick. This gum layer covers the pile face of the carpet web as shown, for example, in the U.S. Pat. No. 4,189,302. In one known process described in U.S. Pat. No. 4,010,709 the dye is caused to form in pools or puddles when applied onto the barrier layer of gum. Because of higher viscosity of the gum layer, dye penetration through the gum layer is delayed until the carpet web is passed through a steamer where the gum becomes less viscous and flows between the yarns to the base of the web, while the dye color is set or fixed in the yarns. Such gum based dyeing processes have achieved wide popularity because of their ability to achieve unusual and varying non-repetative random color patterns despite the increased manufacturing costs resulting from use of such large quantities of gum.

Following the application of the gum and dye and the setting of the dye in the steamer, the carpet web is passed through a rinsing (i.e., washing) stage wherein the carpet web is sprayed with water to wash off excess gum, dyes and other chemicals, the gum and rinse water normally being dumped into a municipal sanitary disposal system. After rinsing, the carpet web is passed through a dryer wherein the carpet web is dried and thence to a collecting box from which it is rolled.

Although the prior art gum based dyeing processes have been most useful in developing unique color patterns, such dyeing processes are subject to a number of disadvantages. In particular, such processes require a large amount of gum which is wasteful and costly. More importantly, the gum which is washed out at the rinsing stage is most likely to be flushed into the local sanitary sewage system, local streams or holding pools from which it may seep into the ground. Such disposal creates a series environmental problems which are only now being given serious attention by local and federal agencies.

Additionally, these prior art processes use a relatively large amount of heated water which in turn requires the use of relatively large amounts of energy, especially at the steaming stage and drying stage of such processes. The energy requirements for these processes, as well and the pollution resulted from chemical disposal cause operational costs to be relatively high.

SUMMARY OF THE INVENTION

Accordingly, it is a principal object of the present invention to provide a method and apparatus for a continuous carpet dyeing system wherein gum and water are reclaimed and reused and latent heat is recovered and used to minimize energy requirements of the system.

Another object of the present invention is to provide a continuous carpet dyeing process and system having relatively low operational costs.

A further object of the present invention is to provide a continuous carpet dyeing system and process wherein used gum and water are reclaimed and reused.

Still another object of the present invention is to provide a dyeing process and system wherein entry water is preheated by recycled gum in order to minimize the energy requirements of the dyeing process.

A still further object of the present is to provide a dyeing process and system having relatively low energy requirements.

These and other objects are realized by the present invention which provides a continuous carpet dyeing process for coloring the pile yarns of a carpet web or the like, including the steps of extracting hot gum from the web after the dye has been set in the pile face by passing the carpet web through a steamer, the hot gum being extracted before any rinsing of the web. The extracted hot gum is then passed through a filter whereby the gum is sufficiently filtered for reuse in the dyeing process. Further prior to its reuse, the extracted hot gum is passed through heat exchanger to transfer latent heat from the hot extracted gum to entry water on its way to a boiler used in the dyeing process. The extracting of the gum is accomplished by a vacuum extractor. The process further provides for reuse of water by collecting the rinse water in rinsing pit, passing the collected water through a filter for lint removal, passing the filtered water into a water storage tank and drawing water from the water storage tank for rinsing the pile yarns.

In accordance with the present invention, there is provided a continuous dyeing system for coloring the pile yarns of a carpet web or the like including a conveyer for transporting the carpet web through a plurality of treating stages including a gum applicator, one or more dye applicators, a steamer for setting dye applied to the pile yarns, a rinser for washing the carpet web and pile yarns, a dryer for drying the carpet web and a gum reclamation subsystem. The gum reclamation subsystem includes a vacuum gum extractor downstream from the steamer for removing gum from the carpet web. A gum conduit is provided for feeding gum from the gum extractor to the gum applicator. The gum conduit includes at least a first filter for filtering the gum, whereby gum may be reused in the dyeing system. The gum conduit further includes a heat exchanger for transferring latent heat from the gum to entry water on its way to a boiler in the dyeing system. The system further includes a water recycling subsystem including a rinsing pit under the rinser for collecting water used in the rinse stage, a filter for cleaning lint out of water from the rinsing pit, a water storage tank for receiving water from the filter, and a conduit for providing water from the water storage tank back to the rinser. Override control valves are provided for both the gum and water recycling systems so that recycled gum and water may be either returned directly to the operating line or directed to associated storage tanks.

BRIEF DESCRIPTION OF DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

FIG. 3 comprised of matching parts FIGS. 3A and FIGS. 3B, shows a top view of the present invention with the gum reclamation subsystem and the water recycling subsystem shown in detail.

DETAILED DESCRIPTION OF THE INVENTION

Figure 1:
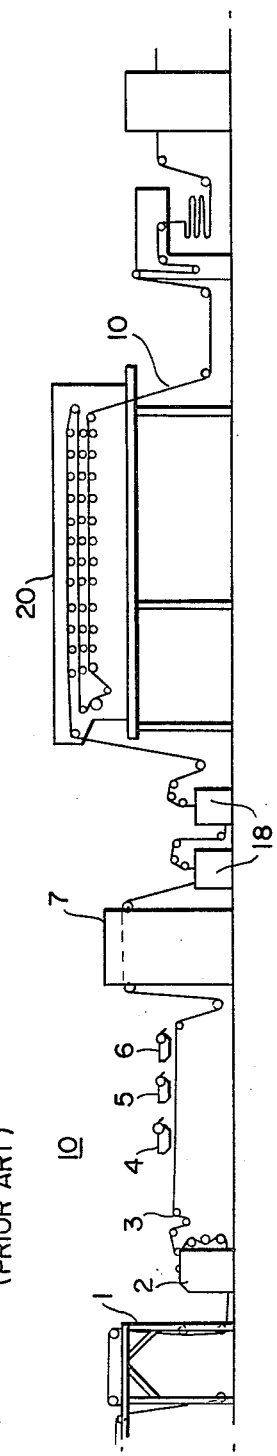
FIG. 1, is a schematic view of a prior art carpet dyeing process and apparatus as described and illustrated in U.S. Pat. No. 4,189,302.

As shown in FIG. 1, a carpet web 10 moves downstream from left to right through the several stages of a carpet line as indicated by the arrow. The major components shown in FIG. 1 are illustrated schematically. These components, with the exception of the gum reclamation subsystem and water recycle subsystem and water recycles subsystem, and will not be described in detail. However, if a better understanding of the operation of the continuous carpet dyeing system and the individual components therein, reference may be made to the U.S. Pat. No. 4,189,302 or one of the aforenoted U.S. patents, the subject matter of these patents being hereby incorporated by reference.

As noted in these patents, a complete carpet dyeing line or apparatus includes conventional guiding and infeed means 1 for a tufted carpet web or like pile fabric 10 which conventionally has a breadth of 12 to 15 feet. The fabricated backing generally comprises woven primary backing fabric into which pile yarns have been stitched and then secured thereto additionally by an adhesive. A woven secondary backing fabric may be laminated to the adhesive and the primary backing fabric. Alternatively, the secondary backing may take the form of a latex or hot melt material. The pile face yarns may be in the form of a cut pile, or one of a variety of styles or patterns, such as, for example, high, low loop, cut loop, shag, etc.

The guiding and infeed means 1 is driven so as to maintain a continuous supply of carpet web 10 to a preconditioning unit. Prior to being fed into the preconditioning unit, the carpet web is driven over a conventional back beater roller assembly, not shown, and the pile face is vacuumed to remove any lint. After initial cleaning, the web 10 is transported to the pre-conditioning unit 2 where a wetting agent is applied to assist in achieving proper penetration and dispersal of dye color. The conditioning unit may be a conventional Kuster pad applicator for application of wetting agent or, if desired, the application of a base dyed to shade the face yarn.

The liquid applied at the pre-conditioning unit may also include a polyester solvent carrier. A suitable wetting agent is sold commercially by Union Carbide under the trade name 1559 which is a 9 mole ethylene oxide. Other examples of suitable agents are benzyl alcohol and a non-ionic wetting agent such as a polyether alcohol sold on the market under the name Deceresol NI. Other conventional wetting agents and solvents may likewise be used such as, for example, ethylene oxide or ethoxylated alcohol, and the particular solvent or wetting agent chose should avoid damage to the fibers present in the fabric. The above chemicals in relatively weak solutions are all satisfactory for both natural and synthetic yarns used in pile fabrics.

The application of the pretreating liquid to the face of the pile of the fabric is important in obtaining a level dyeing effect which is essential from the standpoint of appearance and saleability of the final product. This pretreating step solubilizes the later applied dyestuff and disperses it uniformly throughout the fiber during the subsequent steam treatment. The liquid carriers assist color penetration into the yarns so that an extremely satisfactory and thorough dyeing result is produced. The subsequent steaming operation completes the dispersion and transfer of the color to all parts of the fabric and also fixes the color.

During pretreatment or wet out as the process is called, background color may be imparted to the carpet pile prior to application of the gum and dye at a downstream dyeing station or stations, to be described. The application of a background color is particularly advantageous for light weight carpets to minimize the objectionable appearance of undyed backing or undyed portions of lower pile face which might become visible upon separation of the pile face yarn. Upon leaving the pad applicator the background color dye is not fixed in the carpet pile so that blending of dye colors may be achieved as desired with later applied dye colors. From the pad applicator the web advances through a system of guide rolls 3 to a gum applicator stage and dye applicator stage. These stages may be made up of a series of roll applicator units 4, 5 and 6 arranged at aspaced intervals of approximately 2½ feet, while the carpet web is fed therethrough in a substantially horizontal plane.

Figure 2:
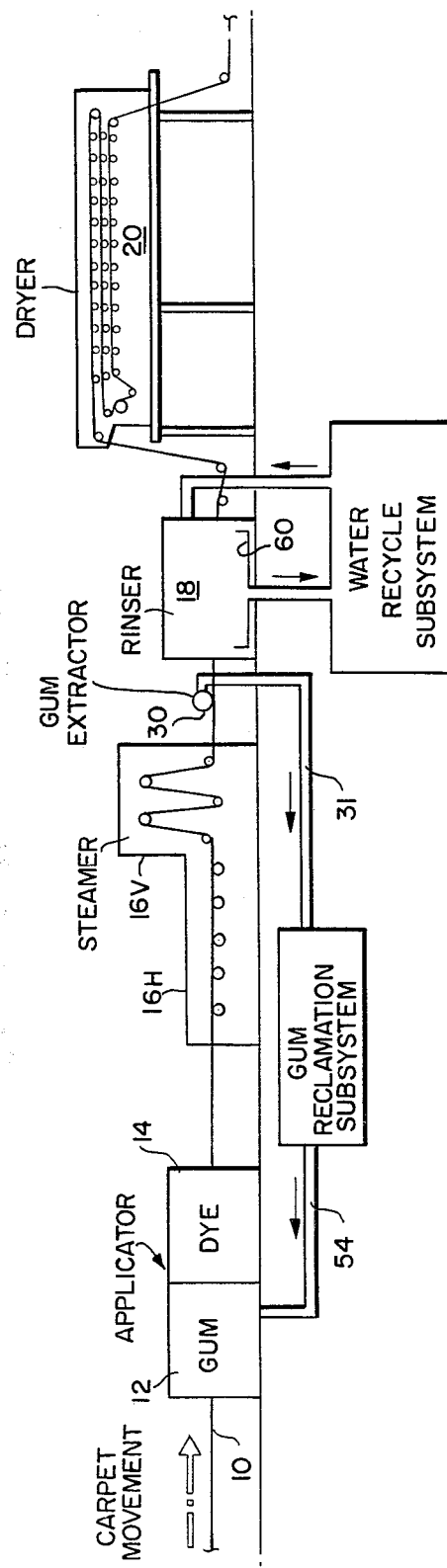
FIG. 2, is a side view showing several of the main components used in the dyeing system of the present invention.

Referring to FIG. 2, it will be seen that applicators 12 and 14 are located downstream of both the pretreating stage. Gum applicator 12 may be constructed to include a feed trough to be filled with a supply of inert viscous natural gum maintained at a constant level. A rotatably driven pick-up roll may be used to transfer the gum from the trough to a doctor blade from which the coating is delivered. Because of the closeness of the yarns and the thickness of the gum, the gum takes on the form of a continuous layer approximately ⅛ to ¼ inch thick which covers the pile face of across the breadth of the carpet web 10.

The gum coating should advantageously be of a sufficient viscosity to cause the gum coating to form a blanket coating or pools extending over the tips of the pile face, but not so great as to prevent penetration by a later applied dye color. The viscosity of the gum is in the range of 100 to 3000 c.p.s. and preferably in the range of 1000 to 3000 c.p.s. The gum may be selected from any one of a number of commercially available gums such as, for example, General Mills Galaxy 1069 and is clear, that is free of any dye coloring. When multiple dye colors are applied, the gum may serve as a carrier for one of the dye colors to achieve a desired coloration of the fabric and as a barrier for another dye color which is dispersed after passage of the steamer.

After application of the heavier viscosity coating, the carpet web 10 continues its travel along a substantially horizontal plant to dye applicator stage 14 madeup of one or more dye applicators for successive application of dye color to the face yarn. Each applicator may take the form of a roll applicator, having a trough filled with a dye solution maintained at a constant level. The dye is advantageously of a viscosity less than that of the viscous gum and preferably in the range of approximately 20 to 400 c.p.s. The lower viscosity of the dye is selected to permit the dye to penetrate the gum layer and smoothly flow through the gum layer to the pile yarn.

Referring to FIG. 1 the carpet web 10 may then be transported directly to a steamer 7 maintained at an elevated temperature of about 212 degrees Farhenheit for fixing the dye. Continued movement of the web 10 transports it pile face up through steamer 7 which as shown in FIG. 2, may be of a vertical or horizontal type 16 wherein the gum is fully dispersed and the dye set or fixed. As shown in FIG. 2, steamer 16, may comprise a horizontal section 16H and a vertical section 16V. A compensating roll (not shown) within the steamer maintains proper tension on the carpet web inside the steamer and also regulates the speed of a drive roll in a conventional manner. At the input end of the steamer, the carpet web after passing the final dye applicator is provided with a slack loop whose size may be regulated by a conventional slack loop control switch sensor (not shown) and associated bar weight.

Following fixation of the dye in the carpet face yarns, the carpet web 10 exits from this steamer and travels through one or more rinsing stages 18 wherein the carpet web is rinsed with water. From the rinser 18 (often referred to as a washbox), the carpet 10 travels through the dryer 20 wherein the carpet web is dryed. The carpet line and components thereof discussed so far with the exception of the gum reclamation and water recycle subsystems are conventional and arranged in a conventional order and therefor have not been discussed in detail.

In accordance with the present invention, as an improvement of the conventional dyeing process described above, the present invention, as shown in FIG. 2, includes a gum reclamation system including a gum extractor 30 disposed at the exit of the steamer 16 between the steamer and the rinser 18. Specifically, gum extractor 30 is in the form of a cylinder disposed closely adjacent to and above the pile face of the carpet and extends across the breadth of the web. The cylinder is either perforated or slit along its bottom face to allow gum to be drawn into the cylinder from the passing web. Although the shape of the extractor is preferably cylindrical, other forms of the extractors can be used which draw off the gum on application of a vacuum. Extractor 30 if desired may be positioned to slightly contact the pile face yarns so as to ensure maximum draw on the gum without excessive back build up of gum. Also, additional extractors may be successively positioned to ensure full extraction of the gum from the face of the carpet web prior to its rinsing in the rinser 18. It should be noted that in the prior art the used gum is normally washed out with the rinse water and passed into the municipal waste system. With increased emphasis being placed on pollution controls by municipalities, dumping of chemical waste materials may no longer be accepted.

Figure 3A:
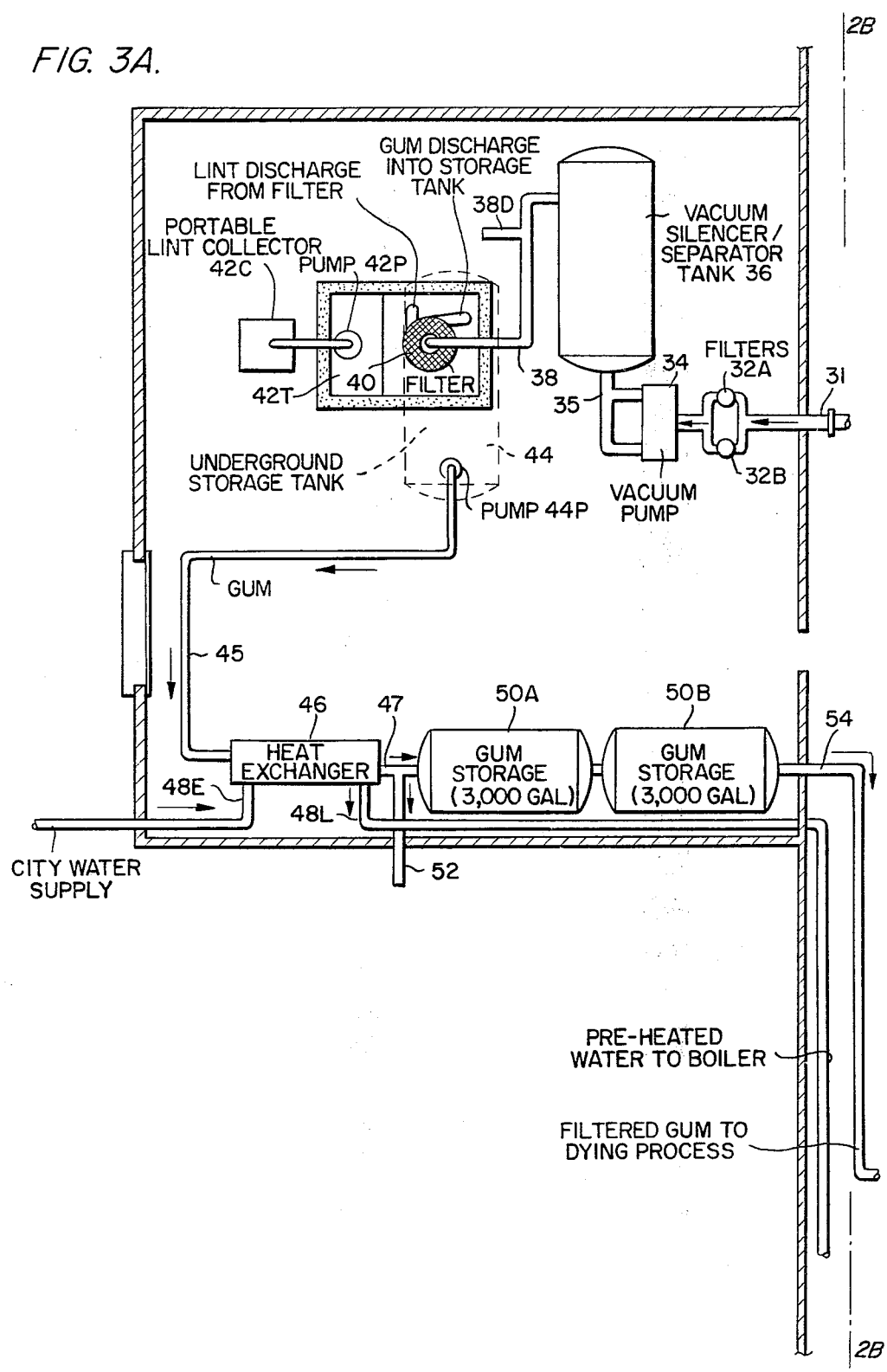

In accordance with the present invention, the gum reclamation subsystem, the details of which are shown in FIG. 3A avoids such problems because substantially all the gum is removed from the carpet 10 by gum extractor 30. As a result, the drain water from rinser 18 will be relatively clear and free from gum. Because the drain water from rinser 18 will be readily free from gum, the drain water can filtered and reused. Even if disposed in the municipal waste disposal system, the drain water should not create any serious pollution problems. More importantly, however the drain water can be advantageously filtered and reused. To this end, in another aspect of the present invention, the used water from rinser 18 is recycled in a water recycling subsystem, the details of which are shown in FIG. 3B.

Before proceeding with a description of the details of the gum reclamation subsystem and the water recycling subsystem of the present invention, it is noted that those components having numbers in the 30's, 40's, and 50's series are part of the gum reclamation subsystem, whereas those components having numbers in the 60's and 70's series are part of the water recycling subsystem.

GUM RECLAMATION SUBSYSTEM

Turning now to FIG. 3,comprised of FIGS. 3A and 3B, and especially considering FIG. 3A, the gum reclamation subsystem of the present invention will be discussed in detail. Follwing the passage of the carpet web 10 through the steamer 16, but prior to the rinsing of the carpet web 10 in rinser 18, the gum is extracted from the carpet web by vacuum extractor 30 connected to filters 32A and 32B via condiut 31. The extracted gum is passed through filters 32A and 32B, which serve to filter out metal and other materials that might have fallen on a carpet web during processing and which might otherwise clog or damage vacuum pump 34 to which conduit 31 is connected. The gum is then passed through conduit 35 connected between the output end of pump 34 and the silencer/separator tank 36. In the vacuum silencer/separator tank, gas mixed with the extracted gum is separated from the gum. The separator tank 36 may include a pressure release valve (not shown) such that gas which was mixed in with the extracted gum may be vented to the atmosphere and prevent excess of pressure build up within the tank. Because of the large volume used in the dyeing process, the separator tank must have a large capacity, preferably about 6,000 gallons. The gum from the separator passes through pipe 38, which includes drain 38D used for cleaning purposes, into a lint filter 40 used for filtering out lint from the gum. In particular, the lint is discharged into a filter pit 42T having an associated pump 42P and associated lint collector 42C for disposing of the lint. The filtered gum from the filter 40 is discharged into an underground storage tank 44. Storage tank 44 includes a discharge pump 44P connected to a heat exchanger 46 via conduit 45.

At this point it should be noted that the gum drawn off the carpet web is drawn off immediately following the steamer stage 16. Thus the temperature of the gum is in the order of 200° F.–212° F. and contains a considerable amount of latent heat. The hot gum is then pumped by pump 44P into heat exchanger 46 having a cold water inlet pipe 48E and a hot water outlet pipe 48L. The latent heat is transferred from the gum to the entry water in a heat exchanger, the water thereby being preheated before it is fed to a boiler (not shown) used in the dyeing system. This will, of course, lessen the total energy requirements for the system inasmuch as the heat gained by the gum upon passage to the steamer 16 which would otherwise be lost is partial recovered. In the preferred embodiment of the invention, the preheated water exiting the heat exchanger is fed to a main boiler from which water is pumped to the steamer. It will be readily apparent that the heated water can be routed to any location within the plant which requires heated water.

From heat exchanger 46, the gum is fed via conduit 47 into gum strorage tanks 50A and 50B, wherefrom the gum may be fed by pipe 54 back into gum applicator 12. Instead, or in addition to, passing the gum from heat exchanger 46 into gum storage tank 50A and 50B, the gum may be conveyed into a tanker truck by way of connection 52, whereby the gum may be transported to a different location for reuse. It should be noted that suitable valves are provided at various conduit locations to facilitate proper transfer of materials and permit maintaence as required.

Those components between gum extractor 30 and gum applicator 12 through which the gum passes may be defined or turned a gum conduit for feeding extracted hot gum from the gum extractor to the gum applicator in which case gum conduit includes the filters, separator tank 36, heat exchanger 46 and the storage tanks as discussed and provides a continuous return or feedback path for reclaiming gum. The following components may be used to realize the gum reclamation subsystem of the present invention;

| Component No. | Name | Type or size |
|---|---|---|
| 30 | vacuum gum extractor | cylindrical tube with axial slot of ⅛" × 13'6" |
| 34 | vacuum pump | Nash vacuum extractor 150 H.P. pump |
| 36 | separation tank | 6,000 gallons |

WATER RECYCLING SUBSYSTEM

Turning now to FIG. 3B, the water recycling subsystem of the present invention will be discussed in detail. A rinsing pit 60 disposed below the conveyor downstream of the gum extractor stage receives the water runoff from the rinser 18. Both rinser 18 and the rinsing pit 60 are conventional structures and are therefore shown only schematically. The water from the rinsing pit 60 flows into a drainage ditch, via conduit 62, which leads to a municipal sewer system—or other waste water depository. To realize the water recycling feature of the present invention, a gate 64 is positioned in ditch 62 and is used to divert water into a holding basin 65C from where it pumped by means of pump 66 into one of two parallel vertical filters 66A and 66B situated respectively in holding basins 65A and 65B. The filters 66A and 66B may be used alternately for filtering water from the rinsing pit 60 in order to remove lint from the water while the other filter is changed. In particular, the lint may be extracted into a portable lint collector 68A, whereas the clean water is supplied into water pit 70. A pump 72 feeds water from water pit 70 via pipe 73 into a water storage tank 74 from where the water may be drawn by a conduit 76 and associated pump 76P in order to be reused in the rinser 18. Additionally, conduit 76 may be used to feed filtered water into other stages of the dyeing process, such as the dye applicator 14. Conduit 78 is connected to the city water supply line and is used to supply water storage tank 74 with water or to make up for water which is lost during the operation of the system. Drain 79 is provided to empty the storage tank 74.

| Component No. | Name | Type or size |
|---|---|---|
| 65A, 65B | Holding basins | two 450 gal. tanks |
| 66A, 66B | filter | Sweco lint screen 64" (105 mesh screen) |
| 72, 76P | pumps | Vortex pumping system 150 GPM |
| 74 | water storage tank | 13,000 gallon capacity |

Although the preferred embodiments of the present invention have been discussed in detail in this specification, it will readily appreciated that various modifications and adaptations within the time will readily apparent to those having ordinary skill in the art. Accordingly, the full scope of the present invention should be determined with reference to the appended claims.

What is claimed is:

1. In method of reclamation of gum from a dyeing process for coloring the pile yarns of a carpet web or the like, continuously conveyed through several operating stages wherein the carpet web is coated at one of said stages with a continuous layer of viscous gum and has applied thereto a dyeing agent for coloring the pile yarns of the web and is passed through a steamer stage for setting of the dye in the pile yarns, the improvement comprising:
    (a) extracting gum from the carpet web after it exits the steamer stage where the dye has been set, the gum being extracted before rinsing of the pile yarns,
    (b) filtering the extracted gum,
    (c) returning the filtered gum to one of said stages for reuse in the dyeing process.

2. The method of claim 1 further including the step of passing the extracted gum through a heat exchanger.

3. The method of claim 2 wherein the extracting of the gum is accomplished by vacuum extractor.

4. The method of claim 1 further including the step of passing the extracted gum through a separator tank prior to its reuse in the dyeing system, for removing gases from the gum.

5. The method of claim 1 further including the step of passing the extracted gum through a heat exchanger to recover heat imparted to the gum in the steamer during the dyeing process.

6. The method of claim 5 further including the step transferring latent heat from the extracted gum to entry water to be used in the dyeing process.

7. The method of claim 6 further including the steps of conveying the carpet web after extraction of gum to a rinse stage, rinsing the carpet web with water and filtering and reusing the rinse water used in the dyeing process.

8. The method of claim 7 wherein the rinsing step and the reusing of the rinse water includes:
collecting the water in a rinsing pit, passing the collected water through a filter for lint removal, storing the filtered water in a water storage tank, and drawing water from the water storage tank for rinsing the carpet web.

9. In a dyeing system for coloring the pile yarns of a carpet web or the like continuously conveyed through several successive operating stages including a dye applicator for applying dye to the pile yarn, a steamer stage for setting dye applied to the pile yarns, a rinser stage for washing the steamed carpet web, and a dryer, for drying the washed pile yarns, the improvement of a gum reclamation subsystem comprising:
a gum extractor for removing gum from the carpet web disposed downstream from said steamer,
a gum applicator for applying gum to the pile yarns upstream from said steamer,
means connected between the gun extractor and the gum applicator for feeding gum from the gum extractor to the gum applicator,
whereby extracted gum may be reused in the dyeing system.

10. The dyeing system of claim 9 wherein said means includes a heat exchanger for transferring heat from said gum to entry water in the dyeing system.

11. The dyeing system of claim 9 or 10 further including a water recycling subsystem operatively connected at said rinser stage for reuse of rinse water in the dyeing system.

12. The dyeing system of claim 11 wherein said gum extractor is disposed upstream from said rinser.

13. The dyeing system of claim 12 wherein said gum extractor is a vacuum extractor.

14. The dyeing system of claim 13 wherein said means further includes a first filter connected to filter the extracted gum prior to its reuse in the dyeing system, and a gum storage tank serially connected between said first filter and said gum applicator.

15. The dyeing system of claim 14 further including a separator tank connected between said first filter and vacuum extractor for removing gases from the extracted gum.

16. The dyeing system of claim 15 further including a second filter in said gum conduit, one of said first and second filters being connected said gum extractor and said separator tank, and the other of said first and second filters being connected between said separator tank and said gum storage tank.

17. The dyeing system of claim 9 further including a water recycling subsystem comprising:
a rinsing pit disposed under said rinser stage for collecting water used in the rinser stage,
a filter for cleaning lint from water collection said rinsing pit,
a water storage tank connected to receive water from said filter, and a conduit connecting said water storage tank to said rinser.

18. In a dyeing system for coloring pile yarns of a carpet web or the like conveyed through several operating stages including a dye applicator, a steamer for setting dye applied to the pile yarns by the dye applicator, a gum applicator for applying gum to the pile yarns upsteam from said streamer, a water rinser for washing the carpet web and a dryer for drying the carpet web, the improvement of a water recycling subsystem comprising:
a water receiving pit for collecting used water after rinsing,
a filter for cleaning lint out of the water collected in said water receiving pit,
a water storage tank connected to receive filtered water from said filter,
a conduit connecting said water storage tank to one of said stages, whereby the filtered water may be reused, and a gum extractor connected to extract gum from the pile yarns upstream form said rinser.

19. The dyeing system of claim 18 further including a heat exchanger connected to said gum extractor and an entry water conduit for transferring heat from gum used in the dyeing process to water flowing through said conduit.

20. The dyeing system of claim 18 further including a gum reclamation subsystem comprising:
a gum applicator for applying gum to the pile yarns upstream from said steamer,
a gum extractor downstream from said steamer, for removing gum from the carpet web yarns a conduit connected to said extractor for feeding gum from the gum extractor to the gum applicator, said conduit including at least a first filter for filtering the gum, whereby gum may be reused in the dyeing system.

21. The dyeing system of claim 20 wherein said gum extractor is a vacuum extractor disposed upstream from said rinser, and said gum reclamation subsystem further includes a separator tank for removing gases from the extracted gum.

* * * * *